United States Patent
Guo et al.

(10) Patent No.: US 10,738,227 B2
(45) Date of Patent: Aug. 11, 2020

(54) POLYCARBONATE-BASED THERMAL CONDUCTIVITY AND DUCTILITY ENHANCED POLYMER COMPOSITIONS AND USES THEREOF

(71) Applicant: SABIC Global Technologies B.V., Bergen op Zoom (NL)

(72) Inventors: Mingcheng Guo, Shanghai (CN); Yaqin Zhang, Shanghai (CN); Shijie Song, Shanghai (CN); Narong An, Shanghai (CN); Yubin Bao, Shanghai (CN)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 16/308,185

(22) PCT Filed: Jun. 6, 2017

(86) PCT No.: PCT/IB2017/053326
§ 371 (c)(1),
(2) Date: Dec. 7, 2018

(87) PCT Pub. No.: WO2017/216678
PCT Pub. Date: Dec. 21, 2017

(65) Prior Publication Data
US 2019/0309205 A1   Oct. 10, 2019

Related U.S. Application Data

(60) Provisional application No. 62/349,276, filed on Jun. 13, 2016.

(51) Int. Cl.
| | | |
|---|---|---|
| *C09K 5/14* | (2006.01) | |
| *B29C 48/00* | (2019.01) | |
| *B29C 45/00* | (2006.01) | |
| *C08L 69/00* | (2006.01) | |
| *B29K 69/00* | (2006.01) | |
| *B29K 509/08* | (2006.01) | |

(52) U.S. Cl.
CPC ............ *C09K 5/14* (2013.01); *B29C 45/0001* (2013.01); *B29C 48/022* (2019.02); *C08L 69/00* (2013.01); *B29K 2069/00* (2013.01); *B29K 2509/08* (2013.01); *B29K 2995/0013* (2013.01); *B29K 2995/0089* (2013.01); *C08K 2201/001* (2013.01); *C08L 2205/025* (2013.01); *C08L 2205/035* (2013.01)

(58) Field of Classification Search
CPC . C09K 5/14; C08K 3/01; C08K 3/013; C08K 3/40; C08K 3/38; C08K 7/02; C08L 69/00
USPC .......................................................... 252/75
See application file for complete search history.

(56) References Cited

U.S. PATENT DOCUMENTS

| | | | | |
|---|---|---|---|---|
| 4,579,910 A | * | 4/1986 | Giles, Jr. ............... | C08L 23/025 525/146 |
| 5,786,424 A | * | 7/1998 | Hofmeister ............ | C08L 69/00 524/140 |
| 6,599,446 B1 | * | 7/2003 | Todt ....................... | H01B 1/12 252/502 |
| 7,723,419 B1 | * | 5/2010 | Manian .................. | C04B 26/02 524/404 |
| 8,915,617 B2 | * | 12/2014 | Negandhi ................ | F21V 5/04 362/294 |
| 2002/0099128 A1 | * | 7/2002 | Patel ....................... | H01B 1/24 524/494 |
| 2006/0036035 A1 | * | 2/2006 | Govaerts ................ | C08L 69/00 525/101 |
| 2006/0074154 A1 | * | 4/2006 | Harashina ............... | C08K 5/51 524/115 |
| 2006/0111501 A1 | * | 5/2006 | Cont ..................... | B82Y 30/00 524/492 |
| 2006/0199879 A1 | * | 9/2006 | Agarwal ................ | C08L 69/00 523/201 |

(Continued)

FOREIGN PATENT DOCUMENTS

| | | |
|---|---|---|
| WO | WO 2015/026014 A1 | 2/2015 |
| WO | WO 2015/189761 A1 | 12/2015 |
| WO | WO 2015/198283 A1 | 12/2015 |

OTHER PUBLICATIONS

International Patent Application No. PCT/IB2017/053326; Int'l Search Report and the Written Opinion; dated Aug. 14, 2017; 11 pages.

(Continued)

*Primary Examiner* — Jane L Stanley
(74) *Attorney, Agent, or Firm* — Baker Hostetler

(57) ABSTRACT

Thermally conductive compositions include from about 20 wt. % to about 80 wt. % of a polycarbonate polymer, from about 0.5 wt. % to about 30 wt. % of an impact modifier, and a thermal conductivity modifier. The thermal conductivity modifier includes from about 0.5 wt. % to about 10 wt. % of a high density polyethylene polymer, from about 0.5 wt. % to about 10 wt. % of a maleic anhydride type copolymer, or from about 0.01 wt. % to about 10 wt. % of an acid component. In some aspects the thermally conductive compositions have a notched Izod impact strength of at least about 30 J/m, a through-plane thermal conductivity of at least about 0.4 W/mK and/or an in-plane thermal conductivity of at least about 1.0 W/mK. Methods for making the compositions and articles formed according to the methods are also described.

16 Claims, No Drawings

(56) References Cited

U.S. PATENT DOCUMENTS

| | | | |
|---|---|---|---|
| 2006/0235117 A1* | 10/2006 | Cont | C08L 51/06 |
| | | | 524/115 |
| 2008/0153959 A1 | 6/2008 | Charati et al. | |
| 2008/0242789 A1* | 10/2008 | Zhu | C08L 67/02 |
| | | | 524/451 |
| 2009/0321687 A1* | 12/2009 | Kim | C08K 3/22 |
| | | | 252/507 |
| 2010/0021717 A1* | 1/2010 | Manian | B82Y 30/00 |
| | | | 428/313.3 |
| 2011/0073799 A1* | 3/2011 | Magni | B82Y 30/00 |
| | | | 252/75 |
| 2015/0076395 A1* | 3/2015 | Negandhi | F21V 5/04 |
| | | | 252/75 |
| 2020/0048435 A1* | 2/2020 | Hamilton | C08L 53/00 |

OTHER PUBLICATIONS

International Patent Application No. PCT/162017/053326; Int'l Preliminary Report on Patentability; dated Dec. 27, 2018; 8 pages.

* cited by examiner

POLYCARBONATE-BASED THERMAL CONDUCTIVITY AND DUCTILITY ENHANCED POLYMER COMPOSITIONS AND USES THEREOF

CROSS-REFERENCE TO RELATED APPLICATION

This application is the National Stage of International Application No. PCT/IB2017/053326, filed Jun. 6, 2017, which claims the benefit of U.S. Provisional Application No. 62/349,276 filed Jun. 13, 2016, the disclosures of which are incorporated herein by this reference in their entireties.

FIELD OF THE DISCLOSURE

The present disclosure relates to thermally conductive compositions, and more specifically to thermally conductive polymer compositions that have good strength properties.

BACKGROUND OF THE DISCLOSURE

Various components of modern electronics devices generate heat that must be removed and/or conducted away from electronics components in order to keep the device operating at a high efficiency. As a result, methods for thermal management of such devices have received more attention in recent years, particularly in light emitting diode (LED) and personal and commercial electronics devices such as cellular telephones, tablet computers, personal computers, notebook and portable computers, and other such equipment, medical applications, RFID applications, automotive applications, and the like. In many cases components of these devices include polymeric materials. While various polymeric materials have been developed that provide good thermal conductivity properties, these polymeric materials suffer from relatively low ductility, which negatively affects their strength (e.g., impact strength) and elongation properties. These and other shortcomings are addressed by aspects of the present disclosure.

SUMMARY

Aspects of the disclosure relate to a thermally conductive composition including:
a. from about 20 wt. % to about 80 wt. % of a polycarbonate polymer;
b. from about 0.5 wt. % to about 30 wt. % of an impact modifier; and
c. a thermal conductivity modifier comprising:
i. from about 0.5 wt. % to about 10 wt. % of a high density polyethylene polymer;
ii. from about 0.5 wt. % to about 10 wt. % of a maleic anhydride type copolymer; or
iii. from about 0.01 wt. % to about 10 wt. % of an acid component;
wherein the thermally conductive composition includes a notched Izod impact strength of at least about 30 J/m, a through-plane thermal conductivity of at least about 0.4 W/mK and an in-plane thermal conductivity of at least about 1.0 W/mK. In further aspects the composition includes:
d. from greater than 0 wt. % to about 50 wt. % of a filler component, the filler component including one or more of a thermally insulative filler and a thermally conductive filler;
e. from greater than 0 wt. % to about 20 wt. % of an additional polymer component; or
f. from greater than 0 wt. % to about 50 wt. % of one or more additional additives.

Aspects of the disclosure further relate to a method for forming a thermally conductive composition, the method including:
a. forming a mixture including:
i. from about 20 wt. % to about 80 wt. % of a polycarbonate polymer;
ii. from about 0.5 wt. % to about 30 wt. % of an impact modifier; and
iii. a thermal conductivity modifier including:
1) from about 0.5 wt. % to about 10 wt. % of a high density polyethylene polymer;
2) from about 0.5 wt. % to about 10 wt. % of a maleic anhydride type copolymer; or
3) from about 0.01 wt. % to about 10 wt. % of an acid component; and
b. injection molding or extruding the mixture to form the thermally conductive composition,
wherein the thermally conductive composition including a notched Izod impact strength of at least about 30 J/m, a through-plane thermal conductivity of at least about 0.4 W/mK and an in-plane thermal conductivity of at least about 1.0 W/mK. In further aspects the mixture formed in step a) further includes:
v. from greater than 0 wt. % to about 50 wt. % of a filler component, the filler component including one or more of a thermally insulative filler and a thermally conductive filler;
v. from greater than 0 wt. % to about 20 wt. % of an additional polymer component; or
vi. from greater than 0 wt. % to about 50 wt. % of one or more additional additives.

DETAILED DESCRIPTION

The present disclosure can be understood more readily by reference to the following detailed description of the disclosure and the Examples included therein. In various aspects, the present disclosure pertains to thermally conductive compositions including from about 20 wt. % to about 80 wt. % of a polycarbonate polymer, from about 0.5 wt. % to about 30 wt. % of an impact modifier, and a thermal conductivity modifier. The thermal conductivity modifier includes from about 0.5 wt. % to about 10 wt. % of a high density polyethylene polymer, from about 0.5 wt. % to about 10 wt. % of a maleic anhydride type copolymer, or from about 0.01 wt. % to about 10 wt. % of an acid component. In some aspects the thermally conductive composition has a notched Izod impact strength of at least about 30 J/m, a through-plane thermal conductivity of at least about 0.4 watts per meter Kelvin (W/mK) and/or an in-plane thermal conductivity of at least about 1.0 W/mK. The compositions may include in further aspects: from greater than 0 wt. % to about 50 wt. % of a filler component, the filler component including one or more of a thermally insulative filler and a thermally conductive filler; from greater than 0 wt. % to about 20 wt. % of an additional polymer component; or from greater than 0 wt. % to about 50 wt. % of one or more additional additives.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the embodiments "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate polymer" includes mixtures of two or more polycarbonate polymers.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optional additive materials" means that the additive materials may or may not be included and that the description includes compositions that both include and that do not include the additive materials.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

As used herein the terms "weight percent," "%," and "wt. %," which can be used interchangeably, indicate the percent by weight of a given component based on the total weight of the composition, unless otherwise specified. That is, unless otherwise specified, all wt. % values are based on the total weight of the composition. It should be understood that the sum of wt. % values for all components in a disclosed composition or formulation are equal to 100.

Certain abbreviations are defined as follows: "g" is grams, "kg" is kilograms, "° C." is degrees Celsius, "min" is minutes, "mm" is millimeter, "mPa" is megapascal, "WiFi" is a system of accessing the internet from remote machines, "GPS" is Global Positioning System—a global system of U.S. navigational satellites which provide positional and velocity data. "LED" is light-emitting diode, "RF" is radio frequency, and "RFID" is radio frequency identification.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Thermally Conductive Compositions

Aspects of the disclosure relate to thermally conductive compositions including:

a. from about 20 wt. % to about 80 wt. % of a polycarbonate polymer;

b. from about 0.5 wt. % to about 30 wt. % of an impact modifier; and c. a thermal conductivity modifier including:

i. from about 0.5 wt. % to about 10 wt. % of a high density polyethylene polymer;

ii. from about 0.5 wt. % to about 10 wt. % of a maleic anhydride type copolymer; or iii. from about 0.01 wt. % to about 10 wt. % of an acid component;

In certain aspects the thermally conductive composition includes a notched Izod impact strength of at least about 30 J/m, a through-plane thermal conductivity of at least about 0.4 W/mK and/or an in-plane thermal conductivity of at least about 1.0 W/mK.

Polycarbonate Polymer

In some aspects the thermally conductive composition includes a polycarbonate polymer. As used herein, "polycarbonate" refers to an oligomer or polymer comprising residues of one or more dihydroxy compounds, e.g., dihydroxy aromatic compounds, joined by carbonate linkages; it also encompasses homopolycarbonates, copolycarbonates, and (co)polyester carbonates. The terms "residues" and "structural units", used in reference to the constituents of the polymers, are synonymous throughout the specification.

In certain aspects the polycarbonate polymer is a Bisphenol-A polycarbonate, a high molecular weight (Mw) high flow/ductile (HFD) polycarbonate, a low Mw HFD polycarbonate, or a combination thereof.

The terms "BisA," "BPA," or "bisphenol A," which can be used interchangeably, as used herein refers to a compound having a structure represented by the formula:

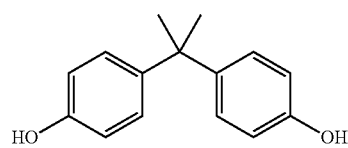 [SMILES: CC(C)(c1ccc(O)cc1)c1ccc(O)cc1]

BisA can also be referred to by the name 4,4'-(propane-2,2-diyl)diphenol; p,p'-isopropylidenebisphenol; or 2,2-bis(4-hydroxyphenyl)propane. BisA has the CAS #80-05-7.

In some aspects the high flow/ductile polycarbonate is a polycarbonate that provides very high flow (e.g., about 40% greater than conventional polycarbonate), while maintaining the toughness and ductility for flowability that is typical in conventional polycarbonate. Exemplary high flow/ductile polycarbonates suitable for use in aspects of the present disclosure include the Lexan™ HFD line of polycarbonates, available from SABIC. For a given melt flow, Lexan™ HFD has about a 10-15° C. lower ductile/brittle transition temperature than conventional PC. In addition, Lexan™ HFD exhibits high ductility at temperatures down to about −40° F., and it processes at temperatures about 20° F. lower than conventional PC having the same ductility.

An exemplary Bisphenol-A polycarbonate suitable for use in aspects of the disclosure includes, but is not limited to, a PC Copolymer (various grades of which are available from SABIC), which includes repeating units derived from BPA and repeating units derived from sebacic acid. In a further aspect, the polycarbonate polymer could be a Bisphenol-A polycarbonate homopolymer, or a blend of the PC Copolymer and the Bisphenol-A polycarbonate homopolymer.

As used herein, "high molecular weight" refers to a molecular weight (Mw) of about 58,000 to about 75,000 grams/mole. As used herein, "low molecular weight" refers to a Mw of about 15,000 to about 58,000 grams/mole, as measured by gel permeation chromatography using BPA polycarbonate standards.

In aspects of the disclosure the thermally conductive composition includes from about 20 wt. % to about 80 wt. % a polycarbonate polymer. In particular aspects the thermally conductive composition includes from about 25 wt. % to about 70 wt. % of a polycarbonate polymer, and in further aspects the thermally conductive composition includes from about 35 wt. % to about 65 wt. % a polycarbonate polymer, or even from about 35 wt. % to about 50 wt. % a polycarbonate polymer.

Impact Modifier

In some aspects the thermally conductive composition includes an impact modifier. Impact modifiers can improve impact strength of polymer compositions, and can reduce brittleness, crack propagation and notch-sensitivity issues inherent in some polymer compositions.

In an aspect, suitable impact modifiers can include an epoxy-functional block copolymer. The epoxy-functional block copolymer can include units derived from a $C_{2-20}$ olefin and units derived from a glycidyl (meth)acrylate. Exemplary olefins include ethylene, propylene, butylene, and the like. The olefin units can be present in the copolymer in the form of blocks, e.g., as polyethylene, polypropylene, polybutylene, and the like blocks. It is also possible to use mixtures of olefins, i.e., blocks containing a mixture of ethylene and propylene units, or blocks of polyethylene together with blocks of polypropylene.

In addition to glycidyl (meth)acrylate units, the epoxy-functional block copolymers can further include additional units, for example $C_{1-4}$ alkyl (meth)acrylate units. In one aspect, the impact modifier is terpolymeric, comprising polyethylene blocks, methyl acrylate blocks, and glycidyl methacrylate blocks. Specific impact modifiers are a co- or terpolymer including units of ethylene, glycidyl methacrylate (GMA), and methyl acrylate.

More specific examples of suitable impact modifiers for use in aspects of the present disclosure include, but are not limited to: polycarbonate/siloxane copolymer compounds (e.g., EXL PC, available from SABIC); chain-branched molecular-structured polycarbonate (examples of which include but are not limited to 1.1.1-tris-(p-hydroxyphenyl) ethan (THPE) branched polycarbonate and 4-hydroxybenzonitrile (HBN) endcapped polycarbonate (CFR)); ethylene-propylene (EP) rubber (e.g., EPM rubber, EPDM rubber, and maleic anhydride grafted EP copolymer); acrylic rubber; methylmethacrylate-butadiene-styrene terpolymer (MBS); ethylene-co-glycidyl methacrylate (EGMA); ethylene-methyl acrylate with glycidyl methacrylate (EMAGMA); styrene-butadiene-styrene (SBS); styrene-ethylene/1-butene-styrene (SEBS); and combinations thereof.

In certain aspects the impact modifier may be present the thermally conductive composition in an amount of from about 0.5 wt. % to about 30 wt. %. In other aspects the impact modifier may be present the thermally conductive composition in an amount of from about 1 wt. % to about 25 wt. %, or from about 2 wt. % to about 20 wt. %, or from about 5 wt. % to about 10 wt. %.

Thermal Conductivity Modifier

Thermally conductive compositions according to aspects of the present disclosure include a thermal conductivity modifier. The thermal conductivity modifier may include a high density polyethylene polymer, a maleic anhydride type copolymer, or an acid component. The thermal conductivity modifier may improve the through-plane thermal conductivity and/or the in-plane thermal conductivity of the composition, as described in further detail below. In certain aspects the through-plane thermal conductivity and/or the in-plane thermal conductivity of the composition is improved without a corresponding substantial decrease in the impact properties (e.g., the notched Izod impact strength) of the composition.

High Density Polyethylene Polymer

As used herein, high density polyethylene (HDPE) polymer refers to a polyethylene polymer having a density of at least about 0.94 g/cm$^3$. Suitable high density polyethylene (HDPE) polymers for use in aspects of the present disclosure include, but are not limited to HDPE 5070(UV), available from Daelim Industrial Co., Dowlex™ IP-10, available from Dow Chemicals, PE HD 6908.19 NAT, available from ExxonMobil, M80064, available from SABIC, CC254, available from SABIC, and combinations thereof. It has been surprisingly found that the inclusion of an HDPE polymer in some aspects may increase the thermal conductivity of the composition without a decrease in mechanical performance.

In certain aspects the HDPE polymer may be present in the thermally conductive composition in an amount of from about 0.5 wt. % to about 10 wt. %. In other aspects the HDPE polymer may be present in the thermally conductive composition in an amount of from about 1 wt. % to about 5 wt. %, or from about 1 wt. % to about 3 wt. %.

Maleic Anhydride Type Copolymer

Suitable maleic anhydride type copolymers for use in aspects of the present disclosure include, but are not limited to: ethylene-propylene copolymer (MAH-g-EPM); ethylene-propylene-diene terpolymer (MAH-g-EPDM); ethylene-octene copolymer (MAH-g-POE); ethylene-butene copolymer (MAH-g-EBR); styrene-ethylene/butadiene-styrene copolymer (MAH-g-SEBS) and combinations thereof. The maleic anhydride type copolymer may be added in combination with an acid component, as described below.

In certain aspects the maleic anhydride type copolymer may be present in the thermally conductive composition in an amount of from about from about 0.5 wt. % to about 10 wt. %. In other aspects the maleic anhydride type copolymer may be present in the thermally conductive composition in an amount of from about from about 2 wt. % to about 5 wt. %, or from about 2 wt. % to about 3 wt. %.

Acid Component

Suitable acid components for use in aspects of the present disclosure include, but are not limited to, inorganic acids, inorganic acid salts, organic acids, and combinations thereof. Exemplary inorganic acids include, but are not limited to, phosphorous acid, boric acid and combinations thereof. An exemplary inorganic acid salt includes, but is not limited to, mono zinc phosphate. Exemplary organic acids include, but are not limited to phosphorus-containing flame retardants such as bisphenol-A diphenyl phosphate (BPADP), resorcinol diphosphate (RDP), phosphorous acid, borate acid, Fyrolflex™ Sol-DP (a phosphate ester flame retardant available from ICL Industrial Products), phenoxyphosphazene oligomer, bisphenol-A bis(diphenyl phosphate) (BDP), and combinations thereof.

In certain aspects the acid component may be present in the thermally conductive composition in an amount of from about from about 0.01 wt. % to about 10 wt. %. In other aspects the acid component may be present in the thermally conductive composition in an amount of from about 0.1 wt. % to about 5 wt. %, or from about 1 wt. % to about 5 wt. %, or from about from about 2 wt. % to about 4 wt. %, or about 3 wt. %.

As discussed above, in some aspects the acid component may be included in combination with a maleic anhydride type copolymer. It has been surprisingly found that the inclusion of acid component with the maleic anhydride type copolymer in some aspects may contribute to improved thermal conductivity and good ductility/strength properties of the composition.

Filler Component

Some aspects of the thermally conductive compositions according to the present disclosure include from greater than 0 wt. % to about 50 wt. % of a filler component. The filler component may include one or more of a thermally insulative filler and a thermally conductive filler. The filler component is optional in the thermally conductive compositions, and may or may not be included therein.

Exemplary thermally insulative fillers suitable for use in aspects of the present disclosure include, but are not limited to, $H_2Mg_3(SiO_3)_4$ (talc), $CaCO_3$ (calcium carbonate), $Mg(OH)_2$ (magnesium hydroxide), mica, BaO (barium oxide), γ-AlO(OH) (boehmite), α-AlO(OH) (diaspore), $Al(OH)_3$ (gibbsite), $BaSO_4$ (barium sulfate), $CaSiO_3$ (wollastonite), $ZrO_2$ (zirconium oxide), $SiO_2$ (silicon oxide), glass beads, glass fibers, $MgO.xAl_2O_3$ (magnesium aluminate), $CaMg(CO_3)_2$ (dolomite), clay, or a combination thereof. In some aspects the thermally insulative filler has a thermal conductivity less than or equal to 10 W/mK. In certain aspects, one or more of these materials may have a thermal conductivity of greater than 10 W/mk. In such aspects the material may be considered to be thermally conductive rather than thermally insulative.

Exemplary thermally conductive fillers suitable for use in aspects of the present disclosure include, but are not limited to, AlN (aluminum nitride), BN (boron nitride), including hexagonal boron nitride (h-BN), $MgSiN_2$ (magnesium silicon nitride), SiC (Silicon carbide), $Al_4C_3$ (aluminum carbide), $Al_2Oy$ (aluminum oxides), AlON (aluminum oxynitride), $Si_3N_4$ (silicon nitride), graphite, ceramic-coated graphite, expanded graphite, graphene, carbon fiber, carbon nanotube (CNT), graphitized carbon black, ZnS (zinc sulfide), CaO (calcium oxide), MgO (magnesium oxide), ZnO (zinc oxide), $TiO_2$ (titanium dioxide), and a combination thereof. In some aspects the thermally conductive filler has a thermal conductivity greater than 10 W/mK, such as from about 10-30 W/mK, greater than 30 W/mK and greater than 50 W/mK. In certain aspects, one or more of these materials may have a thermal conductivity less than 10 W/mk. In such aspects the material may be considered to be thermally insulative rather than thermally conductive.

In particular aspects of the disclosure thermally conductive compositions include talc as a thermally insulative filler and one or more of boron nitride (BN) and titanium dioxide ($TiO_2$) as thermally conductive fillers.

The talc used in certain aspects of the disclosure can have different particle sizes, considering the impact of particle size on composite thermal conductivity. In one aspect, the talc average particle size or D50 can range from 1 to 500 micrometer (m). Particle size may refer to the size of a single talc crystal or an agglomerate of crystals at any of its dimensions. In some aspects the talc is a low-pH form of talc with a pH of from about 7 to about 9, which is generally lower relative to traditional talc products.

The boron nitride used in aspects of the disclosure may be hexagonal boron nitride (h-BN), which can be complete h-BN or Turbostratic boron nitride (t-BN). The BN particle can include large-sized single BN crystal powder, agglomerates of small-sized BN particles, the agglomerated spherical powder, BN fiber or a combination thereof. In one aspect, the BN average particle size or D50 in diameter can range from about 100 nm to about 500 mm. In an aspect, within this range, the BN average particle size or D50 in diameter can range from about 1 to 500 micrometers. In another aspect, within this range, the BN average particle size or D50 in diameter can be greater than about 3 micrometer, or greater than about 5 micrometer. Particle size may refer to the size of a single BN particle or an agglomerate of particles at any of its dimensions. In one aspect, the BN has a BN purity ranging from 95% to 99.8%. In further aspects, a large single crystal sized flake BN with an average size ranging from 3 to 50 micrometer and a BN purity of over 98% is used. In some aspects the BN is a low-pH form of BN with a pH of from about 7 to about 9, which is generally lower relative to traditional BN products.

Any of the filler components described herein could be surface treated with one or more suitable functional groups to enhance its compatibility with the polycarbonate polymer. In certain aspects the filler component is in particulate form or fibrous form. Fibrous fillers in certain aspects have a circular or non-circular cross section.

Thermally conductive compositions according to aspects of the disclosure which include the optional filler component may include from greater than 0 wt. % to about 50 wt. % of a filler component. In some aspects the thermally conductive composition includes from about 10 wt. % to about 50 wt. % of a filler component, or from about 15 wt. % to about 45 wt. % of a filler component, or from about 20 wt. % to about 40 wt. % of a filler component, or from about 30 wt. % to about 40 wt. % of a filler component.

Additional Polymer Component

Some aspects of the thermally conductive compositions according to the present disclosure include from greater than 0 wt. % to about 20 wt. % of an additional polymer component. The additional polymer component is optional in the thermally conductive compositions, and may or may not be included therein.

Suitable additional polymer components for use in aspects of the disclosure include, but are not limited to, acrylonitrile butadiene styrene (ABS), polybutylene terephthalate (PBT), and a combination thereof.

As used herein, acrylonitrile butadiene styrene refers to an acrylonitrile-butadiene-styrene polymer which can be an acrylonitrile-butadiene-styrene terpolymer or a blend of styrene-butadiene rubber and styrene-acrylonitrile copolymer.

As used herein, polybutylene terephthalate can be used interchangeably with poly(1,4-butylene terephthalate). Polybutylene terephthalate is one type of polyester. Polyesters, which include poly(alkylene dicarboxylates), liquid crystalline polyesters, and polyester copolymers, can be useful in the disclosed compositions of the present disclosure.

Thermally conductive compositions according to aspects of the disclosure which include the additional polymer component may include from greater than 0 wt. % to about 20 wt. % of the additional polymer component.

Additional Additives

Some aspects of the thermally conductive compositions according to the present disclosure include from greater than 0 wt. % to about 50 wt. % of one or more additional additives, with the proviso that the additives are selected so as to not significantly adversely affect the desired properties of the composition. The additional additives are optional in the thermally conductive compositions, and may or may not be included therein. Combinations of additives can be used. Such additives can be mixed at a suitable time during the mixing of the components for forming the composition. Exemplary and non-limiting examples of additive materials that can be present in the disclosed thermally conductive compositions include one or more of a reinforcing filler, enhancer, acid scavenger, anti-drip agent, antioxidant, antistatic agent, chain extender, colorant (e.g., pigment and/or dye), de-molding agent, flow promoter, flow modifier, lubricant, mold release agent, plasticizer, quenching agent, flame retardant (including for example a thermal stabilizer, a hydrolytic stabilizer, or a light stabilizer), UV absorbing additive, UV reflecting additive and UV stabilizer.

In a particular aspect, the disclosed thermally conductive compositions can include an antioxidant or "stabilizer." Numerous stabilizers are known may be used, in one aspect the stabilizer is a hindered phenol, such as IRGANOX® 1076, available from Ciba Specialty Chemicals (China) Ltd.

In some aspects, the one or more additional additives may be present in an amount from greater than 0 wt. % to about 50 wt. %. In further aspects, the one or more additional additives is present in an amount from about 0.01 wt. % to about 20 wt. %, or from about 0.01 wt. % to about 15 wt. %, or from about 0.01 wt. % to about 10 wt. %, or from about 0.01 wt. % to about 5 wt. %, or from about 0.01 wt. % to about 2 wt. %, or even from about 0.5 wt. % to about 1.5 wt. %.

Selected Properties of Thermally Conductive Compositions

Thermally conductive compositions according to some aspects of the disclosure have improved thermal conductivity properties as compared to previously known compositions that lack one or more of the thermal conductivity modifiers such as those described herein.

Specifically, the thermally conductive compositions, when tested in accordance with ASTM E-1461, have a through-plane thermal conductivity of at least about 0.40 W/mK. In other aspects the thermally conductive compositions, when tested in accordance with ASTM E-1461, have a through-plane thermal conductivity of at least about 0.45 W/mK, or a through-plane thermal conductivity of at least about 0.50 W/mK, or a through-plane thermal conductivity of at least about 0.55 W/mK, or a through-plane thermal conductivity of at least about 0.60 W/mK, or a through-plane thermal conductivity of at least about 0.65 W/mK, or a through-plane thermal conductivity of at least about 0.70 W/mK.

In further aspects the thermally conductive compositions, when tested in accordance with ASTM E-1461, have an in-plane conductivity of at least about 1.0 W/mK. In other aspects the thermally conductive compositions, when tested in accordance with ASTM E-1461, have an in-plane thermal conductivity of at least about 1.1 W/mK, or an in-plane thermal conductivity of at least about 1.2 W/mK, or an in-plane thermal conductivity of at least about 1.3 W/mK, or an in-plane thermal conductivity of at least about 1.4 W/mK, or an in-plane thermal conductivity of at least about 1.5 W/mK, or an in-plane thermal conductivity of at least about 1.6 W/mK, or an in-plane thermal conductivity of at least about 1.7 W/mK, or an in-plane thermal conductivity of at least about 1.8 W/mK, or an in-plane thermal conductivity of at least about 1.9 W/mK.

The through-plane thermal conductivity and in-plane thermal conductivity of the thermally conductive compositions may also be described in comparison to a substantially identical reference composition in the absence of the thermal conductivity modifier described herein. Thus, in some aspects the thermally conductive composition has a through-plane thermal conductivity that is at least about 10% higher than a substantially identical reference composition in the absence of the thermal conductivity modifier. In other aspects the thermally conductive composition has a through-plane thermal conductivity that is at least about 20% higher than a substantially identical reference composition in the absence of the thermal conductivity modifier, or has a through-plane thermal conductivity that is at least about 30% higher than a substantially identical reference composition in the absence of the thermal conductivity modifier. In further aspects the thermally conductive composition has an in-plane thermal conductivity that is at least about 10% higher than a substantially identical reference composition in the absence of the thermal conductivity modifier. In yet further aspects the thermally conductive composition has an in-plane thermal conductivity that is at least about 20% higher than a substantially identical reference composition in the absence of the thermal conductivity modifier, or in-plane thermal conductivity that is at least about 30% higher than a substantially identical reference composition in the absence of the thermal conductivity modifier.

Thermally conductive compositions according to some aspects of the disclosure may also maintain their impact properties as compared to previously known compositions that lack one or more of the thermal conductivity modifiers such as those described herein. This is surprising because it was previously known that adding thermally conductive fillers to increase the thermal conductivity of polycarbonate compositions resulted in the compositions having a corresponding decrease in impact properties and ductility; thermally conductive compositions having both high thermal conductivity properties and impact properties were not known.

Specifically, the thermally conductive compositions, when tested in accordance with ASTM D256, have a notched Izod impact strength of at least about 30 Joule per meter (Jim). In further aspects the thermally conductive compositions, when tested in accordance with ASTM D256, have a notched Izod impact strength of at least about 40 Jim, or a notched Izod impact strength of at least about 50 Jim, or a notched Izod impact strength of at least about 60 Jim, or a notched Izod impact strength of at least about 70 Jim, or a notched Izod impact strength of at least about 80 Jim, or a notched Izod impact strength of at least about 90 Jim, or a notched Izod impact strength of at least about 100 Jim, or a notched Izod impact strength of at least about 150 Jim, or a notched Izod impact strength of at least about 200 Jim, or a notched Izod impact strength of at least about 250 Jim, or a notched Izod impact strength of at least about 300 Jim.

In certain aspects, thermally conductive compositions according to aspects of the disclosure have some combination of the properties listed above. For example, in particular aspects the thermally conductive composition has a notched Izod impact strength of at least about 30 Jim, a through-plane thermal conductivity of at least about 0.4 W/mK and an in-plane thermal conductivity of at least about 1.0 W/mK. In further aspects the thermally conductive composition has a notched Izod impact strength of at least about 80 Jim, a through-plane thermal conductivity of at least about 0.4 W/mK and an in-plane thermal conductivity of at least about 1.0 W/mK.

Methods of Manufacture

The one or any foregoing components described herein may first be dry blended together, then fed into an extruder from one or multi-feeders, or separately fed into extruder from one or multi-feeders. The one or any foregoing components may be first dry blended with each other, or dry blended with any combination of foregoing components, then fed into an extruder from one or multi-feeders, or separately fed into an extruder from one or multi-feeders. The fillers used in the invention may also be first processed into a masterbatch, then fed into an extruder. The components may be fed into the extruder from a throat hopper or any side feeders.

The extruders used in the invention may have a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, co-kneaders, disc-pack processors, various other types of extrusion equipment, or combinations comprising at least one of the foregoing.

The components may also be mixed together and then melt-blended to form the thermally conductive compositions. The melt blending of the components involves the use of shear force, extensional force, compressive force, ultrasonic energy, electromagnetic energy, thermal energy or combinations comprising at least one of the foregoing forces or forms of energy.

The barrel temperature on the extruder during compounding can be set at the temperature where at least a portion of the polycarbonate has reached a temperature greater than or equal to about the melting temperature, if the resin is a semi-crystalline organic polymer, or the flow point (e.g., the glass transition temperature) if the resin is an amorphous resin.

The mixture including the foregoing mentioned components may be subject to multiple blending and forming steps if desirable. For example, the moldable composition may first be extruded and formed into pellets. The pellets may then be fed into a molding machine where it may be formed into any desirable shape or product. Alternatively, the moldable composition emanating from a single melt blender may be formed into sheets or strands and subjected to post-extrusion processes such as annealing, uniaxial or biaxial orientation.

The temperature of the melt in the present process may in some aspects be maintained as low as possible in order to avoid excessive degradation of the components (e.g., the polycarbonate material/resin). In certain aspects the melt temperature is maintained between about 230° C. and about 350° C., although higher temperatures can be used provided that the residence time of the resin in the processing equipment is kept relatively short. In some aspects the melt processed composition exits processing equipment such as an extruder through small exit holes in a die. The resulting strands of molten resin may be cooled by passing the strands through a water bath. The cooled strands can be chopped into small pellets for packaging and further handling.

Articles of Manufacture

In certain aspects, the present disclosure pertains to shaped, formed, or molded articles comprising the thermally conductive compositions. The thermally conductive compositions can be molded into useful shaped articles by a variety of means such as injection molding, extrusion, rotational molding, blow molding and thermoforming to form articles and structural components of, for example, personal or commercial electronics devices, including but not limited to cellular telephones, tablet computers, personal computers, notebook and portable computers, and other such equipment, medical applications, RFID applications, automotive applications, and the like. In a further aspect, the article is extrusion molded. In a still further aspect, the article is injection molded.

Various combinations of elements of this disclosure are encompassed by this disclosure, e.g., combinations of elements from dependent claims that depend upon the same independent claim.

Aspects of the Disclosure

In various aspects, the present disclosure pertains to and includes at least the following aspects.

Aspect 1: A thermally conductive composition comprising:
  a. from about 20 wt. % to about 80 wt. % of a polycarbonate polymer;
  b. from about 0.5 wt. % to about 30 wt. % of an impact modifier; and
  c. a thermal conductivity modifier comprising:
    i. from about 0.5 wt. % to about 10 wt. % of a high density polyethylene polymer;
    ii. from about 0.5 wt. % to about 10 wt. % of a maleic anhydride type copolymer; or
    iii. from about 0.01 wt. % to about 10 wt. % of an acid component;
wherein the thermally conductive composition comprises a notched Izod impact strength of at least about 30 J/m, a through-plane thermal conductivity of at least about 0.4 W/mK and an in-plane thermal conductivity of at least about 1.0 W/mK.

Aspect 2: The thermally conductive composition according to Aspect 1, further comprising:
  d. from greater than 0 wt. % to about 50 wt. % of a filler component, the filler component including one or more of a thermally insulative filler and a thermally conductive filler;
  e. from greater than 0 wt. % to about 20 wt. % of an additional polymer component; or
  f. from greater than 0 wt. % to about 50 wt. % of one or more additional additives.

Aspect 3: The thermally conductive composition according to Aspect 1 or 2, wherein the polycarbonate polymer comprises Bisphenol-A polycarbonate, a high molecular weight (Mw) high flow/ductile polycarbonate, a low Mw high flow/ductile polycarbonate, or a combination thereof.

Aspect 4: The thermally conductive composition according to Aspect 3, wherein the Bisphenol-A polycarbonate comprises: a polycarbonate copolymer including repeating units derived from Bisphenol-A and repeating units derived from sebacic acid; a Bisphenol-A polycarbonate homopolymer; or a combination thereof.

Aspect 5: The thermally conductive composition according to any of Aspects 1 to 4, wherein the impact modifier comprises a polycarbonate/siloxane copolymer compound, a chain-branched molecular-structured polycarbonate, an ethylene-propylene rubber, an acrylic rubber; a methylmethacrylate-butadiene-styrene terpolymer, an ethylene-co-glycidyl methacrylate, an ethylene-methyl acrylate with glycidyl methacrylate, a styrene-butadiene-styrene, a styrene-ethylene/1-butene-styrene, or a combination thereof.

Aspect 6: The thermally conductive composition according to any of Aspects 1 to 5, wherein the maleic anhydride type copolymer comprises ethylene-propylene copolymer (MAH-g-EPM), ethylene-propylene-diene terpolymer (MAH-g-EPDM), ethylene-octene copolymer (MAH-g-POE), ethylene-butene copolymer (MAH-g-EBR), styrene-ethylene/butadiene-styrene copolymer (MAH-g-SEBS), or a combination thereof.

Aspect 7: The thermally conductive composition according to any of Aspects 1 to 6, wherein the acid component comprises mono zinc phosphate, bisphenol-A diphenyl phosphate (BPADP), resorcinol diphosphate (RDP), phosphorous acid, borate acid, a phosphate ester, a phenoxyphosphazene oligomer, a bisphenol-A bis(diphenyl phosphate), or a combination thereof.

Aspect 8: The thermally conductive composition according to any of Aspects 1 to 7, wherein the filler component comprises a thermally insulative filler, a thermally conductive filler, or a combination thereof.

Aspect 9: The thermally conductive composition according to Aspect 8, wherein:
  the thermally insulative filler comprises $H_2Mg_3(SiO_3)_4$ (talc), $CaCO_3$ (calcium carbonate), $Mg(OH)_2$ (magnesium hydroxide), mica, BaO (barium oxide), γ-AlO(OH) (boehmite), α-AlO(OH) (diaspore), $Al(OH)_3$ (gibbsite), $BaSO_4$ (barium sulfate), $CaSiO_3$ (wollastonite), $ZrO_2$ (zirconium oxide), $SiO_2$ (silicon oxide), glass beads, glass fibers, $MgO \cdot xAl_2O_3$ (magnesium aluminate), $CaMg(CO_3)_2$ (dolomite), clay, or a combination thereof; and
  the thermally conductive filler comprises AlN (aluminum nitride), BN (boron nitride), $MgSiN_2$ (magnesium silicon nitride), SiC (Silicon carbide), $Al_4C_3$ (aluminum carbide), $Al_2Oy$ (aluminum oxides), AlON (aluminum oxynitride), $Si_3N_4$ (silicon nitride), graphite, ceramic-coated graphite, expanded graphite, graphene, carbon fiber, carbon nanotube (CNT), graphitized carbon black, ZnS (zinc sulfide), CaO (calcium oxide), MgO (magnesium oxide), ZnO (zinc oxide), $TiO_2$ (titanium dioxide), or a combination thereof.

Aspect 10: The thermally conductive composition according to any of Aspects 1 to 9, wherein the thermally insulative filler comprises titanium dioxide, talc, boron nitride, graphite, or a combination thereof.

Aspect 11: The thermally conductive composition according to any of Aspects 2 to 10, wherein the filler component is in particulate form, fibrous form, or a combination of particulate form and fibrous form.

Aspect 12: The thermally conductive composition according to any of Aspects 2 to 11, wherein the filler component comprises glass fiber.

Aspect 13: The thermally conductive composition according to any of Aspects 2 to 12, wherein the filler component comprises a circular or non-circular cross section.

Aspect 14: The thermally conductive composition according to any of Aspects 1 to 13, wherein the composition comprises an additional polymer component comprising acrylonitrile butadiene styrene (ABS), polybutylene terephthalate (PBT), or a combination thereof.

Aspect 15: An article formed from the thermally conductive composition according to any of Aspects 1 to 14.

Aspect 16: A method for forming a thermally conductive composition, the method comprising
   a. forming a mixture comprising:
     i. from about 20 wt. % to about 80 wt. % of a polycarbonate polymer;
     ii. from about 0.5 wt. % to about 30 wt. % of an impact modifier; and
     iii. a thermal conductivity modifier comprising:
        1) from about 0.5 wt. % to about 10 wt. % of a high density polyethylene polymer;
        2) from about 0.5 wt. % to about 10 wt. % of a maleic anhydride type copolymer; or
        3) from about 0.01 wt. % to about 10 wt. % of an acid component; and
   b. injection molding or extruding the mixture to form the thermally conductive composition,
wherein the thermally conductive composition comprises a notched Izod impact strength of at least about 30 J/m, a through-plane thermal conductivity of at least about 0.4 W/mK and an in-plane thermal conductivity of at least about 1.0 W/mK.

Aspect 17: The method according to Aspect 16, wherein the mixture further comprises:
     iv. from greater than 0 wt. % to about 50 wt. % of a filler component, the filler component including one or more of a thermally insulative filler and a thermally conductive filler;
     v. from greater than 0 wt. % to about 20 wt. % of an additional polymer component; or
     vi. from greater than 0 wt. % to about 50 wt. % of one or more additional additives.

Aspect 18: The method according to Aspect 16 or 17, wherein the polycarbonate polymer comprises: a high Mw high flow/ductile polycarbonate; a low Mw high flow/ductile polycarbonate; a polycarbonate copolymer including repeating units derived from Bisphenol-A and repeating units derived from sebacic acid; a Bisphenol-A polycarbonate homopolymer; or a combination thereof.

Aspect 19: The method according to any of Aspects 16 to 18, wherein:
the maleic anhydride type copolymer comprises ethylene-propylene copolymer (MAH-g-EPM), ethylene-propylene-diene terpolymer (MAH-g-EPDM), ethylene-octene copolymer (MAH-g-POE), ethylene-butene copolymer (MAH-g-EBR), styrene-ethylene/butadiene-styrene copolymer (MAH-g-SEBS), or a combination thereof; and
the acid component comprises mono zinc phosphate, bisphenol-A diphenyl phosphate (BPADP), resorcinol diphosphate (RDP), a phosphate ester, a phenoxyphosphazene oligomer, a bisphenol-A bis(diphenyl phosphate), or a combination thereof.

Aspect 20: An article formed from the method of any of Aspects 16 to 19.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt. %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Table 1 lists and describes the materials used in the Example compositions set forth below:

TABLE 1

| Component | Chemical description | Source |
|---|---|---|
| Polycarbonate Polymers | | |
| Sebacic acid/BPA/PCP polyestercarbonate (HFD PC, high Mw) | HFD High Mw, CAS: 137397-37-6 | SABIC |
| Sebacic Acid/BPA copolymer (HFD PC, low Mw) | HFD Low Mw, CAS: 137397-37-6 | SABIC |
| 100 Grade PCP | High Mw PC, CAS: 111211-39-3 | SABIC |
| Impact Modifiers | | |
| Opaque PC-Siloxane copolymer (EXL PC) | 20% PC/Siloxane copolymer, PCP endcapped, CAS: 202483-49-6 | SABIC |
| THPE Branched PC | THPE Branched PC Resin, CAS: 111211-39-3 | SABIC |
| Acrylic polymer impact modifier | Acrylic polymer impact modifier: EXL3330, CAS: 25852-37-3, 471-34-1 | Rohm Haas |

TABLE 1-continued

| Component | Chemical description | Source |
|---|---|---|
| *Thermal Conductivity Modifiers* | | |
| HDPE | | |
| HDPE 5070 | HDPE Daelim Poly 5070(UV), CAS: 9002-88-4 | Daelim Industrial Co. |
| Maleic Anhydride Type Copolymer | | |
| MAH-g-EPDM, VA1803 | Maleated EP copolymer: EXXELOR VA1803, CAS: 31069-12-2 | ExxonMobil Chemical |
| MAH-g-EPDM, VA1801 | Maleated EP copolymer: EXXELOR VA1801, CAS: 31069-12-2 | ExxonMobil Chemical |
| Acid Component | | |
| BPADP | Bisphenol A bis(diphenyl phosphate), CAS: 181028795, 115866 | Nagase Co. Ltd |
| PPZ | Phenoxyphosphazene | Fushimi Pharmaceutical Co., Ltd. |
| EAAZ | Aclyn295 Ethylene-acrylic acid Zinc Ionomers CAS: 28208-80-2 | Honeywell |
| $H_3PO_3$ | Phosphorous acid, 50% water solution [CAS: 13598-36-2] | Sinopharm Chemical Reagent Co., Ltd. |
| $H_3BO_3$ | Boric acid, CAS: 10043-35-3 | Sinopharm Chemical Reagent Co., Ltd. |
| MZP | Mono zinc phosphate CAS: 13598-37-3 | Petrochemical and Fibre Department specialty Chemical Division Jebsen & Co. Ltd |
| Zinc Borate | Zinc Borate, Firebrake 500, CAS: 12767-90-7 | Borax Europe Limited |
| *Thermally Conductive Filler* | | |
| Talc | Talc, CAS: 14807-96-6 | Hayashi Kasei |
| BN | Boron Nitride (BNHN, 10 μm) (h-BN) CAS: 10043-11-5 | Dandong Chemical Engineering Institute Co., Ltd. |
| $TiO_2$ | Coated $TiO_2$ K2233, CAS: 13463-67-7 | Kronos |
| *Additional Additives* | | |
| Irganox 1076 | Hindered phenol anti-oxidant, CAS: 002082-79-3 | Ciba Specialty Chemicals (China) Ltd. |
| Irgafos 168 | Tris(2,4-ditert-butylphenyl) phosphite, CAS: 31570-04-4 | Ciba |
| Pentaerythritol tetrastearate (PETs) | Pentaerythritol tetrastearate, CAS: 115-83-3 | Faci Asia Pacific PTE LTD |
| SFR100 | Silicone additive | Momentive |
| T-SAN | Encapsulated PTFE, CAS: 9003-54-7, 9002-84-0 | SABIC |
| *LLDPE (for comparative testing)* | | |
| LLDPE | LLDPE, YUCLAIR ® JL210, CAS: 25087-34-7 | SK Global Chemical |

In the example compositions, samples were prepared using a twin screw extruder (Toshiba TEM-37BS, L/D=40.5). The temperature of the extruder barrel was set at 260° C. Pellets extruded from extruder were then injection molded into a 80×10×3 millimeter (mm) bar and cut into 10×10×3 mm square samples for the through-plane thermal conductivity (TC) measurement, and into a 100 mm diameter×0.4 mm thick sheet and cut into 25 mm diameter×0.4 mm round samples for the in-plane TC measurement.

In all of the examples below, thermal conductivity (through-plane and in-plane) were determined in accordance with ASTM E-1461. Thermal conductivity (κ, Wm-K) was measured with a NanoFlash® LFA447 system using a pyroceram reference having a similar thickness. The measurement determines the thermal diffusivity (a, square centimeters per second ($cm^2/s$)) and the specific heat (Cp, Joule per gram Kelvin (J/g-K)) of the sample. These measurements, together with the density (p, grams per cubic centimeter ($g/cm^3$)) (measured using a water immersion method per ASTM D792), are multiplied to provide the thermal conductivity in the through-plane direction and in-plane direction, according to: $κ=α(T) Cp (T) p(T)$. Each point was repeated three times to ensure accuracy of the TC measurement.

In each of the examples below, notched Izod impact strength was tested per ASTM D256, unnotched Izod impact strength was tested per ASTM D4812, melt volume rate (MVR) was tested per ASTM D1238, ash was tested per ASTM D 5630 Procedure B (2.0 gram (g) sample ashed at 900° C. for not less than 20 minutes), density was tested per ASTM D792, and modulus of elasticity, stress at break and elongation at break were tested per ASTM D638.

TABLE 2

(Example 1)

| Item Description | Unit | C1 | Ex1.1 | Ex1.2 | Ex1.3 |
|---|---|---|---|---|---|
| HFD PC, high Mw | % | 47.3 | 45.3 | 45.3 | 43.3 |
| EXL PC | % | 10 | 10 | 10 | 10 |
| THPE Branched PC | % | 10 | 10 | 10 | 10 |
| HDPE 5070 | % |  | 2 |  | 2 |
| MAH-g-EPDM, VA1803 | % |  |  | 2 | 2 |
| Talc | % | 8 | 8 | 8 | 8 |
| BN | % | 8 | 8 | 8 | 8 |
| $TiO_2$ | % | 16 | 16 | 16 | 16 |
| Irganox 1076 | % | 0.1 | 0.1 | 0.1 | 0.1 |
| PETs | % | 0.1 | 0.1 | 0.1 | 0.1 |
| T-SAN | % | 0.5 | 0.5 | 0.5 | 0.5 |
| Formulation Total |  | 100 | 100 | 100 | 100 |
| Test Description |  |  |  |  |  |
| Through-plane TC | W/(m · K) | 0.55 | 0.63 | 0.65 | 0.71 |
| In-plane TC | W/(m · K) | 1.77 | 2.07 | 2.20 | 2.47 |
| Notched Izod impact strength (Average (Avg)) | J/m | 170 | 79.3 | 370 | 420 |
| Unnotched Izod impact strength (Avg) | J/m | 635 | 483 | 1280 | 1110 |
| MVR (Avg) (300° C./2.16 kilogram (kg)/360 seconds (s)) | $cm^3$/10 min | 8.11 | 11.6 | 6.86 | 6.05 |
| MVR (Avg) (300° C./2.16 kg/1080 s) | $cm^3$/10 min | 9.59 | 10.7 | 9.06 | 7.34 |
| Ash | % | 32.42 | 32.27 | 32.17 | 32.35 |
| Density (Avg) | — | 1.469 | 1.451 | 1.441 | 1.442 |
| Modulus of elasticity (Avg) | MPa | 4001.8 | 3561.4 | 3103.4 | 2831.6 |
| Stress at break (Avg) | MPa | 37.7 | 41.5 | 20.7 | 23.9 |
| Elongation at break (Avg) | % | 8.74 | 4.49 | 6.99 | 9.28 |

Table 2 shows the comparative results of different compositions using HDPE and other impact modifier combinations. Comparative composition C1 included a combination of EXL PC and branched PC, but did not include HDPE. Example Ex1.1 included HDPE; compared to C1 it is evident that TC get increased in both the through-plane and in-plane directions, but impact strength decreased. In Ex 1.2, 2 wt. % of maleated EP copolymer (VA1803) was added to compensate for the impact modifier but the HDPE was excluded; impact strength further improved compared to C1, as did both TC measurements. In Ex1.3, both HDPE and VA1803 were added, and both TC and impact performance further improved compared to all previous samples.

TABLE 3

(Example 2)

| Item Description | Unit | C2 | Ex2 |
|---|---|---|---|
| HFD PC, high Mw | % | 63.3 | 61.3 |
| Acrylic polymer impact modifier | % | 2 | 2 |
| HDPE 5070 | % |  | 2 |
| MAH-g-EPDM, VA1801 | % | 2 | 2 |
| Talc | % | 8 | 8 |
| BN | % | 8 | 8 |
| $TiO_2$ | % | 16 | 16 |
| Irganox 1076 | % | 0.1 | 0.1 |
| PETs | % | 0.1 | 0.1 |
| T-SAN | % | 0.5 | 0.5 |
| Formulation Total |  | 100 | 100 |
| Test Description |  |  |  |
| Through-plane TC | W/(m · K) | 0.71 | 0.86 |
| In-plane TC | W/(m · K) | 2.44 | 2.91 |

TABLE 3-continued (Example 2)

| | Unit | C2 | Ex2 |
|---|---|---|---|
| Notched Izod impact strength (Avg) | J/m | 367 | 372 |
| Unnotched Izod impact strength (Avg) | J/m | 1560 | 1300 |
| MVR (Avg) (300° C./2.16 kg/360 s) | $cm^3$/10 min | 5.83 | 5.08 |
| MVR (Avg) (300° C./2.16 kg/1080 s) | $cm^3$/10 min | 6.48 | 6.48 |
| Ash | % | 32.04 | 31.77 |
| Density (Avg) | — | 1.456 | 1.444 |
| Modulus of elasticity (Avg) | MPa | 3359.8 | 3244.2 |
| Stress at break (Avg) | MPa | 21.6 | 24.4 |
| Elongation at break (Avg) | % | 7.11 | 5.84 |

Table 3 shows further comparative results of adding HDPE with an impact modifier. Comparing Ex2 to comparative composition C2, both TC measurements exhibited a significant increase, while the notched Izod impact strength was not affected.

TABLE 4

(Example 3)

| Item Description | Unit | C3 | Ex3 |
|---|---|---|---|
| 100 Grade PCP | % | 50 | 47 |
| EXL PC | % | 10 | 10 |
| THPE Branched PC | % | 10 | 10 |
| LLDPE | % |  | 3 |
| Talc | % | 30 | 30 |
| Formulation Total |  | 100 | 100 |

TABLE 4-continued (Example 3)

| | Unit | C3 | Ex3 |
|---|---|---|---|
| Test Description | | | |
| Through-plane TC | W/(m · K) | 0.53 | 0.50 |
| In-plane TC | W/(m · K) | 1.82 | 1.73 |
| Notched Izod impact strength (Avg) | J/m | 32 | 57.9 |
| Unnotched Izod impact strength (Avg) | J/m | 210 | 265 |
| MVR (Avg) (300° C./1.2 kg/360 s) | cm³/10 min | 52.7 | 23.1 |
| MVR (Avg) (300° C./1.2 kg/1080 s) | cm³/10 min | 59.9 | 30.9 |
| Ash | % | 30.6 | 30.33 |
| Density (Avg) | — | 1.425 | 1.407 |

Table 4 shows that by adding LLDPE to Ex3 (for purposes of comparing the effect of LLDPE on the composition as compared to the HDPE added to Ex1 and Ex2), both through-plane and in-plane TC decreased compared to C3, although impact performance increased slightly.

From Examples 1-3 above, it was evident that by combining HDPE with different impact modifiers in polycarbonate-based thermal conductive compositions, improved mechanical and thermal conductive performance could be obtained.

TABLE 5

(Example 4)

| | Unit | C4 | Ex4.1 | Ex4.2 | Ex4.3 | Ex4.4 | Ex4.5 |
|---|---|---|---|---|---|---|---|
| Item Description | | | | | | | |
| HFD PC, low Mw | % | 15 | 15 | 15 | 15 | 15 | 15 |
| HFD PC, high Mw | % | 30.8 | 30.79 | 30.75 | 30.7 | 30.7 | 30.6 |
| EXL PC | % | 5 | 5 | 5 | 5 | 5 | 5 |
| THPE Branched PC | % | 5 | 5 | 5 | 5 | 5 | 5 |
| MAH-g-EPDM, VA1803 | % | 3 | 3 | 3 | 3 | 3 | 3 |
| H$_3$PO$_3$ | % | | 0.01 | 0.05 | 0.1 | 0.1 | 0.2 |
| Talc | % | 20 | 20 | 20 | 20 | 20 | 20 |
| TiO$_2$ | % | 20 | 20 | 20 | 20 | 20 | 20 |
| PETs | % | 0.5 | 0.5 | 0.5 | 0.5 | 0.5 | 0.5 |
| Irganox 1076 | % | 0.1 | 0.1 | 0.1 | 0.1 | 0.1 | 0.1 |
| Irgafos 168 | % | 0.1 | 0.1 | 0.1 | 0.1 | 0.1 | 0.1 |
| SFR100 | % | 0.5 | 0.5 | 0.5 | 0.5 | 0.5 | 0.5 |
| Formulation Total | | 100 | 100 | 100 | 100 | 100 | 100 |
| Test Description | | | | | | | |
| MVR, 300° C., 2.16 KG | cm³/10 min | 37.9 | 82.2 | 91.9 | 56.8 | 54.3 | 57.7 |
| Notched Izod impact strength | J/m | 118 | 80.7 | 152 | 150 | 139 | 195 |
| Unnotched Izod impact strength | J/m | 500 | 425 | 675 | 809 | 720 | 865 |
| Ash | % | 38.18 | 39.195 | 39.115 | 37.78 | 39.02 | 38.5 |
| Density | — | 1.552 | 1.558 | 1.555 | 1.545 | 1.552 | 1.545 |
| Through-plane TC | W/(m · K) | 0.438 | 0.483 | 0.518 | 0.497 | 0.512 | 0.64 |
| In-plane TC | W/(m · K) | 1.35 | 1.614 | 1.947 | 1.60 | 1.706 | 1.969 |
| Mw | Daltons | 58534 | 58520 | 57550 | 57321 | 58056 | 57845 |
| Deflection temperature | ° C. | 115 | 114 | 110 | 114 | 112 | 113 |

Table 5 demonstrates comparative results of compositions with a fixed impact modifier (MAH-g-EPDM VA1803) loading at 3 wt. % with varying amounts of phosphorous acid ($H_3PO_3$). Comparative example C4 included a combination of EXL PC and branched PC but no phosphorous acid. The addition of 0.01 wt. % phosphorous acid (Ex4.1) shows an increase in TC in both directions, but a decrease in impact strength. The addition of 0.05 wt. % phosphorous acid (Ex4.2) shows an improvement in impact strength and an improvement of TC in both directions. A further increase in phosphorous acid loading to 0.1 wt. % (Ex4.3 and repeat trial Ex4.4) showed similar results as Ex4.2. Finally, Ex4.5 shows that with a phosphorous acid loading of 0.2 wt. %, TC and impact performance further improved compared to all previous examples.

TABLE 6

(Example 5)

| | Unit | C5 | Ex5.1 | Ex5.2 | Ex5.3 | Ex5.4 | Ex5.5 |
|---|---|---|---|---|---|---|---|
| Item Description | | | | | | | |
| HFD PC, low Mw | % | 15 | 15 | 15 | 15 | 15 | 15 |
| HFD PC, high Mw | % | 30.8 | 30.7 | 30.7 | 30.3 | 30.7 | 30.3 |
| EXL PC | % | 5 | 5 | 5 | 5 | 5 | 5 |
| THPE Branched PC | % | 5 | 5 | 5 | 5 | 5 | 5 |
| MAH-g-EPDM, VA1803 | % | 3 | 3 | 3 | 3 | 3 | 3 |
| $H_3BO_3$ | % | | | | 0.1 | 0.5 | |
| MZP | % | | 0.1 | | | | |
| Zinc Borate | % | | | | | 0.1 | 0.5 |
| Talc | % | 20 | 20 | 20 | 20 | 20 | 20 |
| $TiO_2$ | % | 20 | 20 | 20 | 20 | 20 | 20 |
| PETs | % | 0.5 | 0.5 | 0.5 | 0.5 | 0.5 | 0.5 |
| Irganox 1076 | % | 0.1 | 0.1 | 0.1 | 0.1 | 0.1 | 0.1 |
| Irgafos 168 | % | 0.1 | 0.1 | 0.1 | 0.1 | 0.1 | 0.1 |
| SFR100 | % | 0.5 | 0.5 | 0.5 | 0.5 | 0.5 | 0.5 |
| Formulation Total | | 100 | 100 | 100 | 100 | 100 | 100 |
| Test Description | | | | | | | |
| MVR, 300° C., 2.16 KG | cm$^3$/10 min | 37.9 | 53.4 | 103 | 95.4 | 81 | 89.1 |
| Notched Izod impact strength | J/m | 118 | 89 | 132 | 34 | 61.4 | 61.7 |
| Unnotched Izod impact strength | J/m | 500 | 600 | 537 | 217 | 384 | 389 |
| Ash | % | 38.18 | 38.66 | 37.56 | 37.98 | 38.32 | 40.12 |
| Density | — | 1.552 | 1.547 | 1.545 | 1.552 | 1.554 | 1.569 |
| Through-plane TC | W/(m·K) | 0.438 | 0.529 | 0.638 | 0.703 | 0.655 | 0.608 |
| In-plane TC | W/(m·K) | 1.35 | 1.78 | 2.229 | 2.14 | 2.087 | 1.944 |
| Mw | Daltons | 58534 | 56443 | 57638 | 53104 | 58221 | 56873 |
| Deflection temp (Avg) | ° C. | 115 | 117 | 111 | 111 | 115 | 115 |

Table 6 demonstrates further comparative results of adding an inorganic acid or acidic salt (mono zinc phosphate (MZP), boric acid ($H_3BO_3$), or zinc borate), to a composition including an impact modifier while maintaining MAH-g-EPDM concentration constant. From the data it is seen that TC showed a substantial increase in both directions with the addition of one of these components, while the notched Izod impact strength generally decreased in all examples except for Ex5.2, which included 0.1 wt. % boric acid.

TABLE 7

(Example 6)

| | Unit | C6 | Ex6.1 | Ex6.2 | Ex6.3 |
|---|---|---|---|---|---|
| Item Description | | | | | |
| HFD PC, low Mw | % | 15 | 15 | 15 | 15 |
| HFD PC, high Mw | % | 30.8 | 30.8 | 27.8 | 27.8 |
| EXL PC | % | 5 | 5 | 5 | 5 |
| THPE Branched PC | % | 5 | 5 | 5 | 5 |
| MAH-g-EPDM, VA1803 | % | 3 | | 3 | 3 |
| BPADP | % | | | | 3 |
| PPZ | % | | 3 | 3 | |
| Talc | % | 20 | 20 | 20 | 20 |
| $TiO_2$ | % | 20 | 20 | 20 | 20 |
| PETs | % | 0.5 | 0.5 | 0.5 | 0.5 |

TABLE 7-continued (Example 6)

|  | Unit | C6 | Ex6.1 | Ex6.2 | Ex6.3 |
|---|---|---|---|---|---|
| Irganox 1076 | % | 0.1 | 0.1 | 0.1 | 0.1 |
| Irgafos 168 | % | 0.1 | 0.1 | 0.1 | 0.1 |
| SFR100 | % | 0.5 | 0.5 | 0.5 | 0.5 |
| Formulation Total |  | 100 | 100 | 100 | 100 |
| Test Description |  |  |  |  |  |
| MVR, 300° C., 2.16 KG | cm$^3$/10 min | 37.9 | 119 | 47.6 | 43.4 |
| Notched Izod impact strength | J/m | 118 | 36.2 | 354 | 249 |
| Unnotched Izod impact strength | J/m | 500 | 232 | 1190 | 722 |
| Ash | % | 38.18 | 41.305 | 38.225 | 38.47 |
| Density | — | 1.552 | 1.594 | 1.534 | 1.557 |
| Through-plane TC | W/(m · K) | 0.438 | 0.504 | 0.478 | 0.51 |
| In-plane TC | W/(m · K) | 1.35 | 1.667 | 1.629 | 1.56 |
| Mw | Daltons | 58534 | 59646 | 65148 | 61329 |
| Deflection temperature | ° C. | 115 | 106 | 102 | 99.3 |

The examples in Table 7 show comparative results of adding an organic acid component (phenoxyphosphazene (PPZ) or Bisphenol A bis(diphenyl phosphate) (BPADP)) to the composition. From Ex6.1 it is evident that the addition of PPZ without MAH-g-EPDM resulted in lower impact strength compared to C6, but increased TC (both directions) and molecular weight (Mw). Combining PPZ and MAH-g-EPDM in Ex6.2 not only increased TC (both directions) but also substantially increased impact performance and Mw. Combining a different acidic phosphorous component (BPADP) with MAH-g-EPDM in Ex6.3 also resulted in an increase in impact performance, TC (both directions) and Mw.

The examples in Table 8 show how the ratio of organic acid component (phenoxyphosphazene (PPZ)) or Bisphenol A bis(diphenyl phosphate) (BPADP)) to MAH-g-EPDM affects performance of the composition. From Ex7.1 and Ex7.2 it was observed that if this ratio is less than 1, impact performance improved relative to C7. For higher PPZ loadings at a ratio greater than 1 (Ex7.3 and Ex7.4), impact performance decreased. Finally, Ex7.5 demonstrated that further addition of MAH-g-EPDM (so that the ratio of PPZ to MAH-g-EPDM was less than 1) improved mechanical performance.

TABLE 8

(Example) 7

|  | Unit | C7 | Ex7.1 | Ex7.2 | Ex7.3 | Ex7.4 | Ex7.5 |
|---|---|---|---|---|---|---|---|
| Item Description |  |  |  |  |  |  |  |
| HFD PC, low Mw | % | 15 | 15 | 15 | 15 | 15 | 15 |
| HFD PC, high Mw | % | 30.8 | 29.8 | 27.8 | 25.8 | 20.8 | 25.8 |
| EXL PC | % | 5 | 5 | 5 | 5 | 5 | 5 |
| THPE Branched PC | % | 5 | 5 | 5 | 5 | 5 | 5 |
| MAH-g-EPDM, VA1803 | % | 3 | 3 | 3 | 3 | 3 | 5 |
| PPZ | % |  | 1 | 3 | 5 | 10 | 3 |
| Talc | % | 20 | 20 | 20 | 20 | 20 | 20 |
| TiO$_2$ | % | 20 | 20 | 20 | 20 | 20 | 20 |
| PETs | % | 0.5 | 0.5 | 0.5 | 0.5 | 0.5 | 0.5 |
| Irganox 1076 | % | 0.1 | 0.1 | 0.1 | 0.1 | 0.1 | 0.1 |
| Irgafos 168 | % | 0.1 | 0.1 | 0.1 | 0.1 | 0.1 | 0.1 |
| SFR100 | % | 0.5 | 0.5 | 0.5 | 0.5 | 0.5 | 0.5 |
| Formulation Total |  | 100 | 100 | 100 | 100 | 100 | 100 |
| Test Description |  |  |  |  |  |  |  |
| MVR, 300° C., 2.16 KG | cm$^3$/10 min | 37.9 | 70.4 | 82.2 | 115 | 217 | 88.2 |
| Notched Izod impact strength | J/m | 118 | 154 | 199 | 105 | 57.7 | 203 |
| Unnotched Izod impact strength | J/m | 500 | 483 | 682 | 378 | 322 | 772 |
| Ash | % | 38.18 | 40.04 | 41.6 | 41.60 | 42.79 | 40.62 |
| Density | — | 1.552 | 1.562 | 1.571 | 1.572 | 1.585 | 1.546 |
| Through-plane TC | W/(m · K) | 0.438 | 0.588 | 0.404 | 0.441 | 0.494 | 0.396 |
| In-plane TC | W/(m · K) | 1.35 | 1.894 | 1.549 | 1.596 | 1.655 | 1.482 |
| Mw | Daltons | 58534 | 50074 | 60192 | 59327 | 60868 | 59547 |
| Deflection temperature | ° C. | 115 | 113 | 106 | 101 | 79.8 | 108 |

TABLE 9

(Example 8)

| Item Description | Unit | C8 | Ex8 |
|---|---|---|---|
| HFD PC, low Mw | % | 15 | 15 |
| HFD PC, high Mw | % | 30.8 | 27.8 |
| EXL PC | % | 5 | 5 |
| THPE Branched PC | % | 5 | 5 |
| MAH-g-EPDM, VA1803 | % | 3 | 3 |
| EAAZ | % | | 3 |
| Talc | % | 20 | 20 |
| TiO$_2$ | % | 20 | 20 |
| PETs | % | 0.5 | 0.5 |
| Irganox 1076 | % | 0.1 | 0.1 |
| Irgafos 168 | % | 0.1 | 0.1 |
| SFR100 | % | 0.5 | 0.5 |
| Formulation Total | | 100 | 100 |
| Test Description | | | |
| MVR, 300D, 2.16 KG | cm$^3$/10 min | 37.9 | 20.3 |
| Notched Izod impact strength | J/m | 118 | 345 |
| Unnotched Izod impact strength | J/m | 500 | 773 |
| Ash | % | 38.18 | 40.62 |
| Density | — | 1.552 | 1.508 |
| Through-plane TC | W/(m · K) | 0.438 | 0.53 |
| In-plane TC | W/(m · K) | 1.35 | 1.84 |
| Mw | Daltons | 58534 | 63020 |
| Deflection temperature | °C. | 115 | 111 |

Table 9 demonstrates further comparative results of adding ethylene acrylic acid zinc (EAAZ) as an impact modifier with MAH-g-EPDM not only improved TC in both directions but also improved impact strength and Mw.

TABLE 10

(Example 9)

| Item Description | Unit | C9 | Ex9 |
|---|---|---|---|
| HFD PC, low Mw | % | 22.5 | 22.49 |
| HFD PC, high Mw | % | 22.5 | 22.49 |
| EXL PC | % | 10 | 10 |
| THPE Branched PC | % | 10 | 10 |
| MAH-g-EPDM, VA1801 | % | 2 | 2 |
| H$_3$PO$_3$ | % | | 0.02 |
| Talc | % | 8 | 8 |
| BN | % | 8 | 8 |
| TiO$_2$ | % | 16 | 16 |
| PETs | % | 0.3 | 0.3 |
| Irganox 1076 | | 0.1 | 0.1 |
| Irgafos 168 | | 0.1 | 0.1 |
| T-SAN | % | 0.5 | 0.5 |
| Formulation Total | | 100 | 100 |
| Test Description | | | |
| MVR, 300° C., 1.2 KG | cm$^3$/10 min | 2.11 | 1.47 |
| Notched Izod impact strength | J/m | 266 | 287 |
| Unnotched Izod impact strength | J/m | 1010 | 1220 |
| Ash | % | 32.57 | 32.71 |
| Density | — | 1.45637 | 1.45887 |
| Through-plane TC | W/(m · K) | 0.494 | 0.577 |
| In-plane TC | W/(m · K) | 1.78 | 1.834 |
| Deflection temperature | °C. | 121 | 120 |

Ex9 in Table 10 included a combination of thermal conductive fillers (talc, boron nitride (BN) and titanium dioxide (TiO$_2$)) in addition to MAH-g-EPDM (VA1801) and phosphorous acid (H$_3$PO$_3$). An improvement in TC (both directions) and impact performance was observed as compared to the control composition C9.

From Examples 4-9 above, it was evident that by combining an acid component with different impact modifiers in polycarbonate-based thermal conductive compositions, improved mechanical and thermal conductive performance could be obtained.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

That which is claimed is:

1. A thermally conductive composition comprising:
   a. from about 20 wt. % to about 80 wt. % of a polycarbonate polymer;
   b. from about 0.5 wt. % to about 30 wt. % of an impact modifier comprising a polycarbonate/siloxane copolymer, chain branched molecular-structured polycarbonate, ethylene propylene rubber, acrylic rubber, styrene butadiene styrene, or a combination thereof; and
   c. a thermal conductivity modifier comprising:
      from about 0.5 wt. % to about 10 wt. % of a high density polyethylene polymer and one or more of
      (a) from about 0.5 wt. % to about 10 wt. % of a maleic anhydride type copolymer comprising MAH-g-EPDM, MAH-g-EPM, MAH-g-POE, MAH-g-EBR, or MAH-g-SEBS or a combination thereof, or
      (b) from about 0.01 wt. % to about 10 wt. % of an acid component comprising mono zinc phosphate, bisphenol-A diphenyl phosphate (BPADP), a phenoxyphosphazene oligomer, resorcinol diphosphate (RDP), phosphorous acid, boric acid, a phosphate ester, ethylene-acrylic acid zinc ionomer, zinc borate, or a combination thereof, wherein the thermally conductive composition comprises a notched Izod impact strength of at least about 30 J/m, a through-plane thermal conductivity of at least about 0.4 W/mK and an in-plane thermal conductivity of at least about 1.0 W/mK.

2. The thermally conductive composition according to claim 1, further comprising:
  d. from greater than 0 wt. % to about 50 wt. % of a filler component, the filler component including one or more of a thermally insulative filler and a thermally conductive filler;
  e. from greater than 0 wt. % to about 20 wt. % of an additional polymer component; or
  f. from greater than 0 wt. % to about 50 wt. % of one or more additional additives.

3. The thermally conductive composition according to claim 2, wherein the filler component comprises a thermally insulative filler, a thermally conductive filler, or a combination thereof.

4. The thermally conductive composition according to claim 3, wherein:
  the thermally insulative filler comprises $H_2Mg_3(SiO_3)_4$ (talc), $CaCO_3$ (calcium carbonate), $Mg(OH)_2$ (magnesium hydroxide), mica, BaO (barium oxide), γ-AlO(OH) (boehmite), α-AlO(OH) (diaspore), $Al(OH)_3$ (gibbsite), $BaSO_4$ (barium sulfate), $CaSiO_3$ (wollastonite), $ZrO_2$ (zirconium oxide), $SiO_2$ (silicon oxide), glass beads, glass fibers, $MgO.xAl_2O_3$ (magnesium aluminate), $CaMg(CO_3)_2$ (dolomite), clay, or a combination thereof; and
  the thermally conductive filler comprises AlN (aluminum nitride), BN (boron nitride), $MgSiN_2$ (magnesium silicon nitride), SiC (Silicon carbide), $Al_4C_3$ (aluminum carbide), $Al_2O_y$ (aluminum oxides), AlON (aluminum oxynitride), $Si_3N_4$ (silicon nitride), graphite, ceramic-coated graphite, expanded graphite, graphene, carbon fiber, carbon nanotube (CNT), graphitized carbon black, ZnS (zinc sulfide), CaO (calcium oxide), MgO (magnesium oxide), ZnO (zinc oxide), $TiO_2$ (titanium dioxide), or a combination thereof.

5. The thermally conductive composition according to claim 2, wherein the thermally insulative filler comprises titanium dioxide, talc, boron nitride, graphite, or a combination thereof.

6. The thermally conductive composition according to claim 2, wherein the filler component is in particulate form, fibrous form, or a combination of particulate form and fibrous form.

7. The thermally conductive composition according to claim 2, wherein the filler component comprises glass fiber.

8. The thermally conductive composition according to claim 2, wherein the filler component comprises a circular or non-circular cross section.

9. The thermally conductive composition according to claim 1, wherein the polycarbonate polymer comprises a Bisphenol-A polycarbonate, a high molecular weight (Mw) high flow/ductile polycarbonate, a low Mw high flow/ductile polycarbonate, or a combination thereof.

10. The thermally conductive composition according to claim 9, wherein the Bisphenol-A polycarbonate comprises: a polycarbonate copolymer including repeating units derived from Bisphenol-A and repeating units derived from sebacic acid; a Bisphenol-A polycarbonate homopolymer; or a combination thereof.

11. The thermally conductive composition according to claim 1, wherein the composition comprises an additional polymer component comprising acrylonitrile butadiene styrene (ABS), polybutylene terephthalate (PBT), or a combination thereof.

12. An article formed from the thermally conductive composition according to claim 1.

13. A method for forming a thermally conductive composition, the method comprising:
  a. forming a mixture comprising
    i. from about 20 wt. % to about 80 wt. % of a polycarbonate polymer,
    ii. from about 0.5 wt. % to about 30 wt. % of an impact modifier comprising a polycarbonate/siloxane copolymer, chain branched molecular-structured polycarbonate, ethylene propylene rubber, acrylic rubber, styrene butadiene styrene, or a combination thereof, and
    iii. a thermal conductivity modifier comprising from about 0.5 wt. % to about 10 wt. % of a high density polyethylene polymer and one or more of
      (a) from about 0.5 wt. % to about 10 wt. % of a maleic anhydride type copolymer comprising MAH-g-EPDM, MAH-g-EPM, MAH-g-POE, MAH-g-EBR, or MAH-g-SEBS or a combination thereof, or
      (b) from about 0.01 wt. % to about 10 wt. % of an acid component comprising mono zinc phosphate, bisphenol-A diphenyl phosphate (BPADP), a phenoxyphosphazene oligomer, resorcinol diphosphate (RDP), phosphorous acid, boric acid, a phosphate ester, ethylene-acrylic acid zinc ionomer, zinc borate, or a combination thereof; and
  b. injection molding or extruding the mixture to form the thermally conductive composition,
  wherein the thermally conductive composition comprises a notched Izod impact strength of at least about 30 J/m, a through-plane thermal conductivity of at least about 0.4 W/mK and an in-plane thermal conductivity of at least about 1.0 W/mK.

14. The method according to claim 13, wherein the mixture further comprises:
  iv. from greater than 0 wt. % to about 50 wt. % of a filler component, the filler component including one or more of a thermally insulative filler and a thermally conductive filler;
  v. from greater than 0 wt. % to about 20 wt. % of an additional polymer component; or
  vi. from greater than 0 wt. % to about 50 wt. % of one or more additional additives.

15. The method according to claim 13, wherein the polycarbonate polymer comprises: a high Mw high flow/ductile polycarbonate; a low Mw high flow/ductile polycarbonate; a polycarbonate copolymer including repeating units derived from Bisphenol-A and repeating units derived from sebacic acid; a Bisphenol-A polycarbonate homopolymer; or a combination thereof.

16. An article formed from the method of claim 13.

* * * * *